US012463334B2

(12) United States Patent
Qin

(10) Patent No.: US 12,463,334 B2
(45) Date of Patent: Nov. 4, 2025

(54) ELECTRONIC DEVICE

(71) Applicant: VIVO MOBILE COMMUNICATION CO., LTD., Dongguan (CN)

(72) Inventor: Feixiang Qin, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 150 days.

(21) Appl. No.: 18/244,219

(22) Filed: Sep. 9, 2023

(65) Prior Publication Data

US 2023/0420834 A1 Dec. 28, 2023

Related U.S. Application Data

(63) Continuation of application No. PCT/CN2022/079258, filed on Mar. 4, 2022.

(30) Foreign Application Priority Data

Mar. 10, 2021 (CN) ......................... 202110261677.0

(51) Int. Cl.
*H01Q 1/44* (2006.01)
*H01Q 1/24* (2006.01)

(52) U.S. Cl.
CPC ..................................... *H01Q 1/44* (2013.01)

(58) Field of Classification Search
CPC ........ H01Q 1/24; H01Q 1/243; H01Q 1/2266; H01Q 1/44; H01Q 5/307; H01Q 21/28
See application file for complete search history.

(56) References Cited

FOREIGN PATENT DOCUMENTS

| | | | | |
|---|---|---|---|---|
| CN | 107425284 A | | 12/2017 | |
| CN | 208673942 U | | 3/2019 | |
| CN | 109818133 A | | 5/2019 | |
| CN | 112018505 A | | 12/2020 | |
| CN | 112332092 A | * | 2/2021 | ............... H01Q 1/36 |
| CN | 113054427 A | | 6/2021 | |
| TW | 201941490 A | | 10/2019 | |

OTHER PUBLICATIONS

International Search Report issued in corresponding International Application No. PCT/CN2022/079258, mailed May 24, 2022, 6 pages.
First Office Action issued in related Chinese Application No. 202110261677.0, mailed May 12, 2022, 9 pages.
Second Office Action issued in related Chinese Application No. 202110261677.0, mailed Sep. 15, 2022, 7 pages.

* cited by examiner

*Primary Examiner* — Hoang V Nguyen
(74) *Attorney, Agent, or Firm* — IPX PLLC

(57) ABSTRACT

An electronic device is provided. The electronic device includes: a motherboard, a middle frame, and a side key. The middle frame includes a middle frame body, a first metal portion, and a second metal portion. Both the first metal portion and the second metal portion are connected to the middle frame body. The first metal portion and the second metal portion are connected to each other through an insulation portion. The first metal portion is electrically connected to the motherboard. The first metal portion forms a first antenna. The second metal portion forms a second antenna. The first metal portion includes a first through hole. The second metal portion includes a second through hole. The side key includes a first key cap and a second key cap. The first key cap is disposed in the first through hole. The second key cap is disposed in the second through hole.

10 Claims, 3 Drawing Sheets

ELECTRONIC DEVICE

CROSS-REFERENCE TO RELATED APPLICATIONS

The present application is a continuation of International Application No. PCT/CN2022/079258, filed on Mar. 4, 2022, which claims priority to Chinese Patent Application No. 202110261677.0, filed on Mar. 10, 2021. The entire contents of each of the above-referenced applications are expressly incorporated herein by reference.

TECHNICAL FIELD

This application belongs to the field of communication technologies, and specifically relates to an electronic device.

BACKGROUND

With the rapid development of electronic devices, an electronic device is used more and more widely, and electronic devices such as a mobile phone and a tablet computer play an increasingly important role in aspects such as people's work, life, and entertainment.

An antenna of an electronic device is one of important components that implement a communication function of the electronic device. Therefore, structural design of the antenna is very important to improving use experience of the electronic device. At present, an antenna of an electronic device is disposed at the top or bottom of a housing of the electronic device. Generally, a plastic portion needs to be disposed at the top or bottom of the housing, to implement a radiation function of the antenna. As a result, strength of the housing is low.

SUMMARY

Embodiments of this application aim to provide an electronic device. The electronic device provides an antenna structure design scheme different from that of an existing electronic device, to balance a contradiction between implementing antenna radiation and increasing housing strength.

This application is implemented as follows:

An embodiment of this application provides an electronic device, including:

- a motherboard;
- a middle frame, where the middle frame includes a middle frame body, a first metal portion, and a second metal portion, both the first metal portion and the second metal portion are connected to the middle frame body, the first metal portion and the second metal portion are connected to each other through an insulation portion, the first metal portion is electrically connected to the motherboard, the first metal portion forms a first antenna, the second metal portion forms a second antenna, the first metal portion is provided with a first through hole, and the second metal portion is provided with a second through hole; and
- a side key, where the side key includes a first key cap and a second key cap, the first key cap is disposed in the first through hole, and the second key cap is disposed in the second through hole.

In this embodiment of this application, the first metal portion used for mounting of the first key cap and the second metal portion used for mounting of the second key cap that are in the middle frame are spaced by the insulation portion, and the first metal portion is electrically connected to the motherboard, so that the two metal portions may form the first antenna and the second antenna respectively. Therefore, the electronic device provides an antenna structure different from that of an existing electronic device, to balance a contradiction between implementing antenna radiation and increasing housing strength.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the description and the claims of this application are used to distinguish between similar objects, and do not need to be used to describe a specific order or sequence. It should be understood that, terms used in such a way is interchangeable in proper circumstances, so that the embodiments of this application can be implemented in an order other than the order illustrated or described herein. Objects classified by "first", "second", and the like are usually of a same type, and the quantity of objects is not limited. For example, there may be one or more first objects. In addition, in the specification and the claims, "and/or" represents at least one of connected objects, and a character "/" generally represents an "or" relationship between associated objects.

With reference to the accompanying drawings, an electronic device provided in the embodiments of this application will be described in detail by using specific examples and application scenarios thereof.

Figure 1:
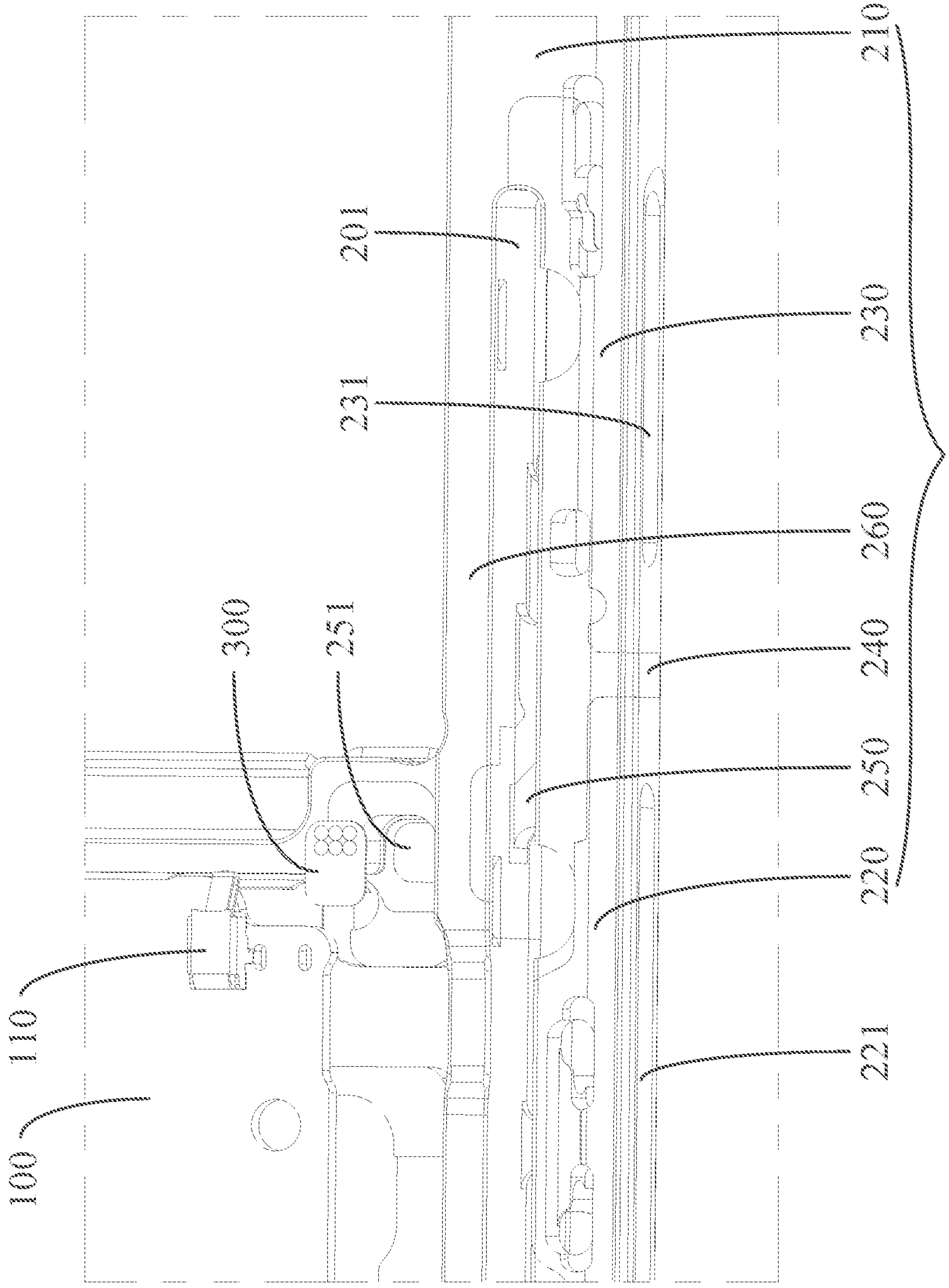
FIG. 1 is a partial exploded view of an electronic device according to an embodiment of this application.
Figure 2:
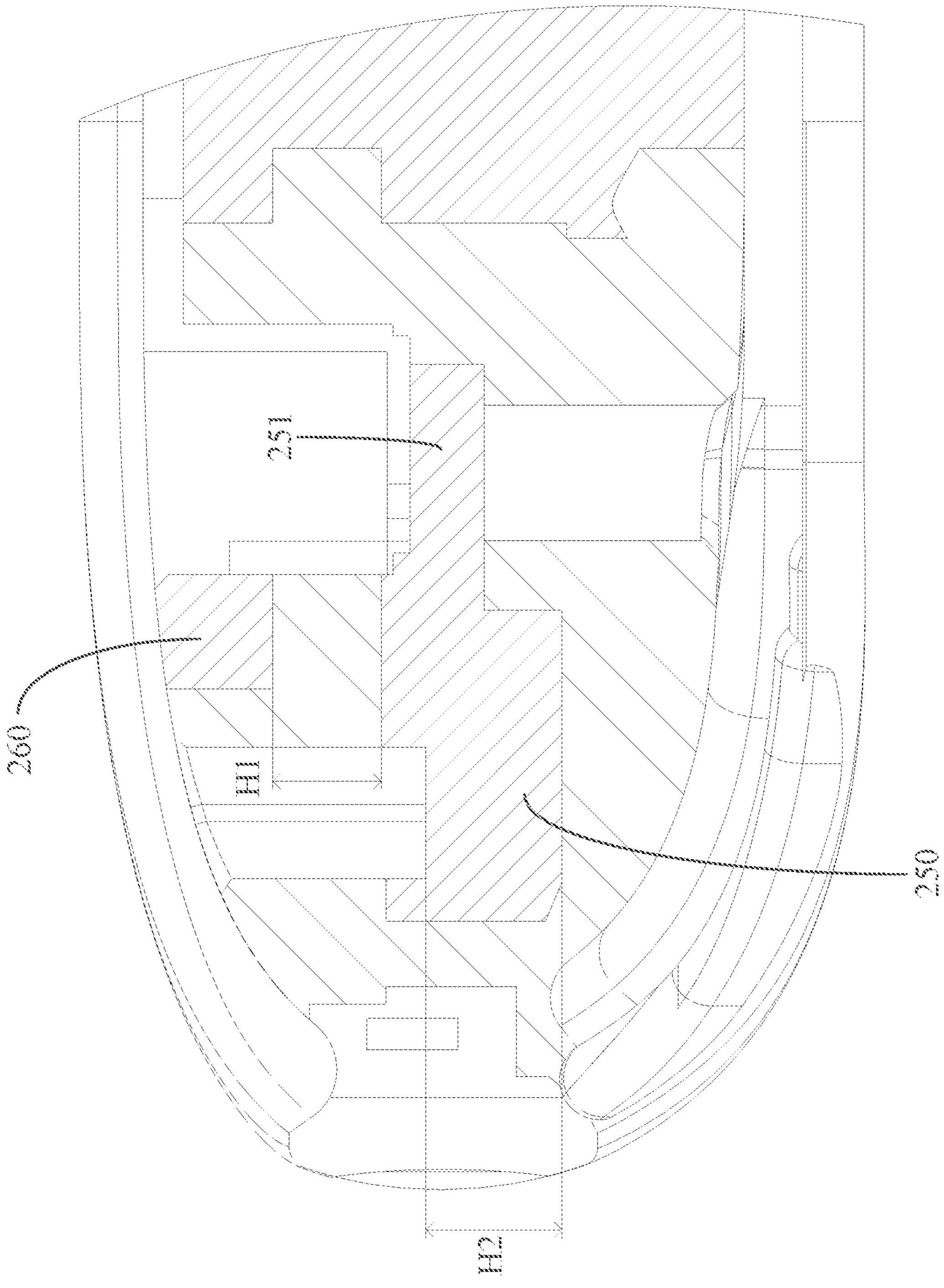
FIG. 2 is a partial sectional view of an electronic device according to an embodiment of this application.
Figure 3:
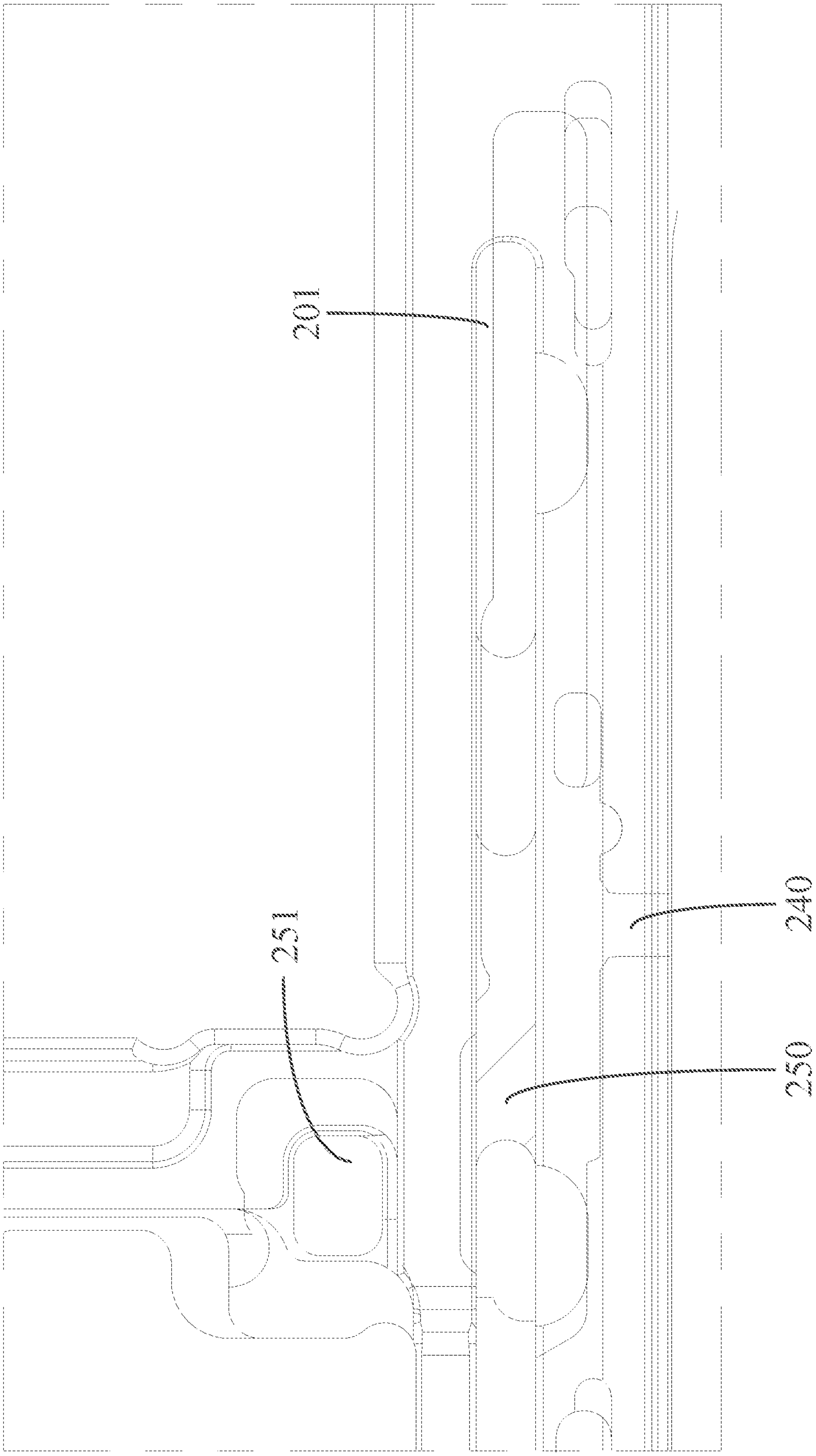
FIG. 3 is a partial enlarged view of an electronic device according to an embodiment of this application.

As shown in FIG. 1 to FIG. 3, embodiments of this application provide an electronic device, including a housing, a motherboard 100, and a side key. The housing may include a middle frame 200.

The middle frame 200 may be a mounting foundation of other components. The motherboard may be connected to the middle frame 200. The middle frame 200 may include a middle frame body 210, a first metal portion 220, and a second metal portion 230. Both the first metal portion 220 and the second metal portion 230 are connected to the middle frame body 210. The first metal portion 220 and the second metal portion 230 are connected to each other through an insulation portion 240. In some embodiments, the middle frame body 210 may also be a metal structure. Both the first metal portion 220 and the second metal portion 230 may be strip-shaped structures. There is a gap among the two metal portions and the middle frame body 210. The clearance is used to accommodate the insulation portion 240. Therefore, the insulation portion 240 is in contact with the middle frame body 210, the first metal portion 220, and the second metal portion 230. In some embodiments, the insulation portion 240 may be made of plastic. The middle frame body 210, the first metal portion 220, the second metal portion 230, and the insulation portion 240 may be formed via integral injection molding.

The first metal portion 220 is electrically connected to the motherboard 100. In addition, because both the first metal portion 220 and the second metal portion 230 are connected to the middle frame body 210, the first metal portion 220 may radiate a signal to form a first antenna, and the second metal portion 230 may radiate a signal to form a second antenna. Bands of the first antenna and the second antenna herein may be different, so that the first antenna and the second antenna may implement communication in different bands.

The first metal portion 220 is provided with a first through hole 221. The second metal portion 230 is provided with a second through hole 231. The side key includes a first key cap and a second key cap. The first key cap is disposed in the first through hole 221. The second key cap is disposed in the second through hole. In addition, the side key further includes a side key circuit board. In some embodiments, a plurality of metal domes may be disposed on the side key circuit board. The first key cap and the second key cap may be opposite different metal domes. The side key circuit board is electrically connected to the motherboard 100. When moving relative to the middle frame 200, the first key cap and the second key cap may press corresponding metal domes, so that the side key circuit board is triggered to send a corresponding signal to the motherboard 100, thereby implementing a function of the side key. In some embodiments, the first key cap may be a key cap of a volume key, and the second key cap may be a key cap of an on-off key.

In this embodiment of this application, the first metal portion 220 used for mounting of the first key cap and the second metal portion 230 used for mounting of the second key cap that are in the middle frame are spaced by the insulation portion 240, and the first metal portion 220 is electrically connected to the motherboard 100, so that the two metal portions may form the first antenna and the second antenna respectively, thereby providing an antenna structure different from that of an existing electronic device. Because the insulation portion 240 needs to space only the first metal portion 220 and the second metal portion 230 apart, space occupied by the insulation portion 240 is small. Therefore, the solution disclosed in this embodiment of this application can balance, without reducing battery capacity, a contradiction between implementing antenna radiation and increasing housing strength. In addition, because both the first metal portion 220 and the second metal portion 230 are on a side surface of the middle frame 200, a hand of a user is generally not in contact with the first metal portion 220 and the second metal portion 230 for a long time, no matter whether the user holds the electronic device transversally or holds the electronic device vertically. Therefore, signal radiation of the first antenna and the second antenna are basically not affected. In addition, the quantity of antennas that need to be additionally disposed on the electronic device is smaller, so that the cost of the electronic device is lower.

Because the first metal portion 220 is relatively farther from the motherboard 100, if the shape of the motherboard 100 enables the motherboard 100 to be directly connected to the first metal portion 220, the manufacture cost of the motherboard 100 is increased. In some embodiments, the middle frame 200 further includes a connecting portion 250. A first end of the connecting portion 250 is connected to the first metal portion 220. A second end of the connecting portion 250 is provided with a connecting sheet 251. The motherboard 100 is provided with an antenna shrapnel 110. The antenna shrapnel 110 is electrically connected to the connecting sheet 251. Herein, the connecting sheet 251 has a large area, so that the antenna shrapnel 110 may be electrically connected to the connecting sheet 251 more reliably. In addition, an elastic deformability of the antenna shrapnel 110 can also enable electrical connection to the connecting sheet 251 to be more reliable. Therefore, reliability of electrical connection between the first metal portion 220 and the motherboard 100 is improved. Further, the insulation portion 240 may wrap around the connecting portion 250, so that an area that is of the insulation portion 240 and that is in contact with the other portion of the middle frame 200 is further increased, thereby increasing the structural strength of the middle frame 200.

In an embodiment, a joint between a first end of the connecting portion 250 and the first metal portion 220 is between the first through hole 221 and the second through hole 231. In this case, the connecting portion 250 may avoid the first through hole 221 and the second through hole 231 as far as possible, to facilitate arrangement of the side key. In addition, a position and a size of the motherboard 100 do not need to be adjusted based on a position of the first metal portion 220, to facilitate structural design of the motherboard 100. The connecting portion 250 may be set to a bent structure, so that the joint between the first end of the connecting portion 250 and the first metal portion 220 is between the first through hole 221 and the second through hole 231. In another embodiment, a direction in which the first metal portion 220 extends towards the antenna shrapnel 110 is defined as a first direction. The connecting portion 250 extends aslant towards the motherboard 100 in the first direction. In this embodiment, the first metal portion 220 and the antenna shrapnel 110 can be connected to each other without setting the connecting portion 250 to a bent structure, so that structural design of the connecting portion 250 is simplified. In some embodiments, the connecting portion 250 may be a linear structure, so that the connecting portion 250 is relatively short.

The connecting sheet 251 may be in direct contact with the antenna shrapnel 110. In another embodiment, the electronic device further includes a plated sheet 300. The plated sheet 300 is attached to the connecting sheet 251. The antenna shrapnel 110 is electrically connected to the connecting sheet 251 through the plated sheet 300. In some embodiments, a structural form of the plated sheet 300 may be a plated steel sheet, a plated copper sheet, or the like. Herein, the oxidation resistance of the plated sheet 300 is high, so that the plated sheet 300 can protect the joint between the antenna shrapnel 110 and the connecting sheet 251 from corrosion. Moreover, the electrical conductivity of the plated sheet 300 is high, so that signal loss is avoided. In addition, the extensibility of the plated sheet 300 is also high, so that a contact area between the plated sheet 300 and the antenna shrapnel 110 is larger under the pressure of the antenna shrapnel 110. Therefore, contact resistance is decreased, to improve signal transmission efficiency. Furthermore, a limit slot may be formed at the position of the connecting sheet 251. The position of the plated sheet 300 may be limited by the limit slot.

The middle frame 200 may further include a cross beam 260, to further increase the structural strength of the middle frame 200. A clearance gap exists between the cross beam 260 and the connecting portion 250. In a direction perpendicular to the motherboard 100, an orthographic projection of the cross beam 260 and an orthographic projection of the connecting portion 250 are at least partially overlapped, so that the structural strength that is of the middle frame 200 and that is at the position of the connecting portion 250 is increased. In addition, the clearance gap between the cross beam 260 and the connecting portion 250 can prevent an antenna signal of the connecting portion 250 from being coupled onto the cross beam 260, thereby improving performance of the first antenna and the second antenna. In some embodiments, a first height H1 of the clearance gap is greater than or equal to 0.9 mm. The first height H1 is a dimension that is of the clearance gap and that in a direction perpendicular to the motherboard 100. Due to this setting, it can be further ensured that a distance between the cross beam 260 and the connecting portion 250 is large enough, thereby further improving the performance of the antennas.

An extending direction of the cross beam 260 may be selected flexibly. The extending direction of the cross beam 260 may be parallel to an extending direction of the first metal portion 220, to simplify structural design of the middle frame 200.

The middle frame 200 may be provided with an assembly groove 201, to facilitate disposing of the side key circuit board. The side key circuit board may be disposed in the assembly groove 201. In this case, the connecting portion 250 may protrude out relative to the bottom surface of the assembly groove 201, to better use limited space in the electronic device. Therefore, it is ensured that the connecting portion 250 has a sufficient height, to increase the structural strength of the connecting portion 250. In some embodiments, a second height H2 that is of the connecting portion 250 and that is at the position of the assembly groove 201 is greater than or equal to 1.2 mm. The second height 12 is a dimension that is of the connecting portion 250 and that in a direction perpendicular to the motherboard 100. This setting can further increase the structural strength of the connecting portion 250.

In another embodiment, the insulation portion 240 may include a reinforcing portion. The reinforcing portion is connected to the middle frame body 210. In a direction perpendicular to the motherboard 100, an orthographic projection of the reinforcing portion and an orthographic projection of the connecting portion 250 are at least partially overlapped. In this case, the reinforcing portion is right above the connecting portion 250. The reinforcing portion is a non-metal structure that does not cause an adverse effect on an antenna signal of the connecting portion 250, thereby improving the performance of the antennas. In addition, the reinforcing portion has specific bending resistance, so that the structural strength of the middle frame 200 is increased. In some embodiments, a third height of the reinforcing portion is greater than or equal to 1.2 mm, where the third height is a dimension that is of the reinforcing portion and that in a direction perpendicular to the motherboard, so that the bending resistance of the reinforcing portion is further improved; and/or a first distance between the reinforcing portion and the connecting sheet 251 is greater than or equal to 6 mm, where the first distance is a distance that is between the reinforcing portion and the connecting sheet 251 and that is parallel to the motherboard 100. This setting enables the reinforcing portion to be close to a middle portion of the connecting portion 250 as much as possible, so that a reinforcing effect of the reinforcing portion on the structural strength of the middle frame 200 is improved.

The reinforcing portion may be disposed corresponding to only one side of the connecting portion. In another embodiment, two ends of the reinforcing portion may be disposed on two sides of the connecting portion 250 respectively, so that the reinforcing portion is longer and has a better reinforcing effect.

In this embodiment of this application, the first metal portion 220 is electrically connected to the motherboard 100. Herein, the first metal portion 220 may be farther away from the motherboard 100 than the second metal portion 230. However, this setting leads to a larger distance between the first metal portion 220 and the motherboard 100. As a result, a connection structure between the first metal portion 220 and the motherboard 100 occupies larger space. Therefore, in another embodiment, the first metal portion 220 may be closer to the motherboard 100 than the second metal portion 230. In this case, a distance between the first through hole 221 and the antenna shrapnel 110 is smaller than a distance between the second through hole 231 and the antenna shrapnel 110, so that the connecting portion 250 may be set smaller, to occupy smaller space. It should be noted that, the distance between the first through hole 221 and the antenna shrapnel 110 may be a distance between a central point of the first through hole 221 and a central point of the antenna shrapnel 110; and the distance between the second through hole 231 and the antenna shrapnel 110 may be a distance between a central point of the second through hole 231 and a central point of the antenna shrapnel 110.

In some embodiments, the connecting sheet 251 may be perpendicular to the motherboard 100, disposed aslant relative to the motherboard 100, or parallel to the motherboard 100. When the connecting sheet 251 is parallel to the motherboard 100, an impact of the connecting sheet 251 on the thickness of the electronic device is relatively small, so that convenience is brought for thinning design of the electronic device.

Specific types of the first antenna and the second antenna are not limited in this embodiment of this application. In some embodiments, the first antenna and the second antenna may include at least one of a WIFI antenna, a 5G antenna, and a GPS antenna. The first antenna and the second antenna may include another antenna. This is not limited in this embodiment of this application. Further, when both the first antenna and the second antenna are WIFI antennas, the first antenna may be a WIFI 2.4G antenna, and the second antenna may be a WIFI 5G antenna, so that usage demands of users for WIFI of different bands are satisfied.

The electronic device disclosed in this embodiment of this application may be a smart phone, a tablet computer, an ebook reader, a wearable device (for example, a smart watch), a video game console, and the like. A specific type of the electronic device is not limited in this embodiment of this application.

The embodiments of this application are described above with reference to the accompanying drawings. However, this application is not limited to the foregoing implementations. The foregoing implementations are merely illustrative instead of restrictive. Under the enlightenment of this application, a person of ordinary skill in the art may make many forms without departing from the essence of this application and the protection scope of the claims, all of which fall within the protection of this application.

What is claimed is:

1. An electronic device, comprising:

a motherboard;

a middle frame comprising: a middle frame body, a connecting portion, a first metal portion, and a second metal portion, wherein:

both the first metal portion and the second metal portion are connected to the middle frame body, the first metal portion and the second metal portion are connected to each other through an insulation portion, the insulation portion wraps around the connecting portion, a first end of the connecting portion is connected to the first metal portion, the first metal portion is electrically connected to the motherboard, the first metal portion forms a first antenna, the second metal portion forms a second antenna, the first metal portion is provided with a first through hole, and the second metal portion is provided with a second through hole; and a side key comprising a first key cap and a second key cap, wherein the first key cap is disposed in the first through hole, and the second key cap is disposed in the second through hole.

2. The electronic device according to claim 1, wherein a second end of the connecting portion is provided with a connecting sheet, the motherboard is provided with an antenna shrapnel, and the antenna shrapnel is electrically connected to the connecting sheet.

3. The electronic device according to claim 1, wherein a joint between the first end of the connecting portion and the first metal portion is between the first through hole and the second through hole.

4. The electronic device according to claim 3, wherein a direction in which the first metal portion extends towards the antenna shrapnel is a first direction, and the connecting portion extends aslant towards the motherboard in the first direction.

5. The electronic device according to claim 2, wherein the electronic device further comprises a plated sheet, wherein the plated sheet is attached to the connecting sheet, and the antenna shrapnel is electrically connected to the connecting sheet through the plated sheet.

6. The electronic device according to claim 1, wherein the middle frame further comprises a cross beam, wherein a clearance gap exists between the cross beam and the connecting portion, and in a direction perpendicular to the motherboard, an orthographic projection of the cross beam and an orthographic projection of the connecting portion are at least partially overlapped.

7. The electronic device according to claim 6, wherein an extending direction of the cross beam is parallel to an extending direction of the first metal portion.

8. The electronic device according to claim 6, wherein:

the side key is provided with a side key circuit board, the middle frame is provided with an assembly groove, the side key circuit board is disposed in the assembly groove, and the connecting portion protrudes out relative to a bottom surface of the assembly groove.

9. The electronic device according to claim 1, wherein the insulation portion comprises a reinforcing portion, wherein the reinforcing portion is connected to the middle frame body, and in a direction perpendicular to the motherboard, an orthographic projection of the reinforcing portion and an orthographic projection of the connecting portion are at least partially overlapped.

10. The electronic device according to claim 1, wherein the first antenna is a WIFI 2.4G antenna, and the second antenna is a WIFI 5G antenna.

* * * * *